United States Patent
Kramer et al.

(10) Patent No.: US 9,432,120 B2
(45) Date of Patent: Aug. 30, 2016

(54) PROBABILISTIC BANDWIDTH CONTROL IN A PASSIVE OPTICAL NETWORK (PON)

(71) Applicant: Broadcom Corporation, Irvine, CA (US)

(72) Inventors: Glen Kramer, Petaluma, CA (US); Lowell D. Lamb, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 89 days.

(21) Appl. No.: 14/290,468

(22) Filed: May 29, 2014

(65) Prior Publication Data

US 2015/0304046 A1 Oct. 22, 2015

Related U.S. Application Data

(60) Provisional application No. 61/981,529, filed on Apr. 18, 2014.

(51) Int. Cl.
| | |
|---|---|
| *H04L 12/42* | (2006.01) |
| *H04B 10/27* | (2013.01) |
| *H04B 10/25* | (2013.01) |
| *H04B 10/40* | (2013.01) |

(Continued)

(52) U.S. Cl.
CPC ............ *H04B 10/27* (2013.01); *H04B 10/25* (2013.01); *H04B 10/40* (2013.01); *H04Q 11/0067* (2013.01); *H04B 10/2575* (2013.01); *H04L 12/2885* (2013.01); *H04Q 2011/0064* (2013.01); *H04Q 2011/0084* (2013.01); *H04Q 2011/0086* (2013.01); *H04Q 2011/0088* (2013.01)

(58) Field of Classification Search
CPC ....... H04L 47/14; H04L 47/22; H04L 47/27; H04L 47/745; H04L 47/805; H04L 47/808; H04L 47/788; H04L 47/36; H04Q 11/0066; H04Q 11/0067; H04Q 2011/0066; H04Q 2011/0067; H04Q 2011/0064; H04Q 2011/0084

See application file for complete search history.

(56) References Cited

U.S. PATENT DOCUMENTS

| | | | | |
|---|---|---|---|---|
| 7,477,845 B2 * | 1/2009 | Kramer | ............ | H04Q 11/0067 398/43 |
| 7,545,813 B2 * | 6/2009 | Davis | .................. | H04L 12/2856 370/395.4 |

(Continued)

FOREIGN PATENT DOCUMENTS

EP   2 362 675 A1   8/2011

OTHER PUBLICATIONS

Hajduczenia et al., "Extended Gate/Report MPCP DUs for EPONs", IEEE Computer Socieity, 2006.*

(Continued)

*Primary Examiner* — Brian O'Connor
(74) *Attorney, Agent, or Firm* — Sterne, Kessler, Goldstein & Fox PLLC

(57) ABSTRACT

Embodiments provide systems and methods for a probabilistic reporting mode, where an Optical Network Unit (ONU) sends a REPORT message only when it has data to transmit. The absence of a REPORT message from an ONU is treated by the Optical Line Terminal (OLT) as indicating absence of data to transmit at the ONU. In another aspect, embodiments include systems and methods for an unsolicited burst mode, where an ONU can be configured to transmit data in the upstream in an unsolicited manner. The unsolicited burst mode includes mechanisms to ensure that no data is lost due to potential collisions between ONUs.

20 Claims, 12 Drawing Sheets

(51) Int. Cl.
*H04Q 11/00* (2006.01)
*H04B 10/2575* (2013.01)
*H04L 12/28* (2006.01)

(56) References Cited

U.S. PATENT DOCUMENTS

| | | | | |
|---|---|---|---|---|
| 7,778,543 B2* | 8/2010 | Ferguson | ............ | H04J 3/14 |
| | | | | 398/10 |
| 7,986,879 B2* | 7/2011 | Lee | ............ | H04Q 11/0667 |
| | | | | 398/66 |
| 8,442,398 B2* | 5/2013 | Li | ............ | H04B 10/0795 |
| | | | | 398/16 |
| 8,493,982 B2* | 7/2013 | Borges | ............ | H04L 12/413 |
| | | | | 370/395.51 |
| 8,768,163 B2* | 7/2014 | Kim | ............ | H04Q 11/0067 |
| | | | | 398/33 |
| 9,100,130 B2* | 8/2015 | Hirth | ............ | H04J 3/1694 |
| 2005/0041682 A1* | 2/2005 | Kramer | ............ | H04Q 11/0067 |
| | | | | 370/458 |
| 2009/0190606 A1* | 7/2009 | Lee | ............ | H04Q 11/0067 |
| | | | | 370/449 |
| 2010/0074628 A1 | 3/2010 | Murakami et al. | | |
| 2010/0098413 A1* | 4/2010 | Li | ............ | H04B 10/0795 |
| | | | | 398/38 |
| 2010/0111523 A1 | 5/2010 | Hirth et al. | | |
| 2010/0239252 A1* | 9/2010 | Davis | ............ | H04L 12/2885 |
| | | | | 398/58 |
| 2011/0142442 A1* | 6/2011 | Hirth | ............ | H04Q 11/0067 |
| | | | | 398/25 |
| 2011/0142444 A1* | 6/2011 | Borges | ............ | H04L 12/413 |
| | | | | 398/25 |
| 2012/0213509 A1* | 8/2012 | Zhang | ............ | H04B 10/0793 |
| | | | | 398/25 |
| 2013/0202293 A1* | 8/2013 | Boyd | ............ | H04Q 11/0067 |
| | | | | 398/38 |

OTHER PUBLICATIONS

Partial European Search Report directed to European Patent Application No. 15001017.1, mailed Oct. 12, 2015; 7 pages.

Yang, et al., "Multicast Burst Polling Transmission of Control Message Passive Optical networks (EPONs)," Feb. 1, 2006, retrieved at http://www.wacong.org/wac2006/allpapers/ifmip/ifmip_207.pdf; 9 pages.

"IEEE Standard for Ethernet, Section Five," IEEE, 2012; 844 pages.

* cited by examiner

PROBABILISTIC BANDWIDTH CONTROL IN A PASSIVE OPTICAL NETWORK (PON)

CROSS-REFERENCE TO RELATED APPLICATION(S)

The present application claims the benefit of U.S. Provisional Application No. 61/981,529, filed Apr. 18, 2014, which is incorporated herein by reference in its entirety.

BACKGROUND

1. Technical Field

The present disclosure relates generally to reducing latency and improving energy efficiency in Passive Optical Network (PON) systems.

2. Background Art

Existing Passive Optical Network (PON) systems employ a periodic polling reporting scheme in which GATE messages are constantly transmitted by the Optical Line Terminal (OLT) in the downstream and corresponding REPORT messages are constantly transmitted in the upstream by the subtending Optical Network Units (ONUs) even by ONUs which have no upstream data traffic (idle ONUs). While the downstream/upstream transmission times of GATE/REPORT messages are relatively short, the transmissions can still consume a considerable amount of bandwidth and power, particularly when multiple ONUs are present.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

For the purpose of presentation only, Ethernet Passive Optical Network (EPON) terminology is used herein. As would be understood by a person of skill in the art based on the teachings herein, this disclosure applies equally to other Passive Optical Network (PON) technologies, including Gigabit Passive Optical Network (GPON) and Broadband Passive Optical Network (BPON), to name a few examples.

Figure 1:
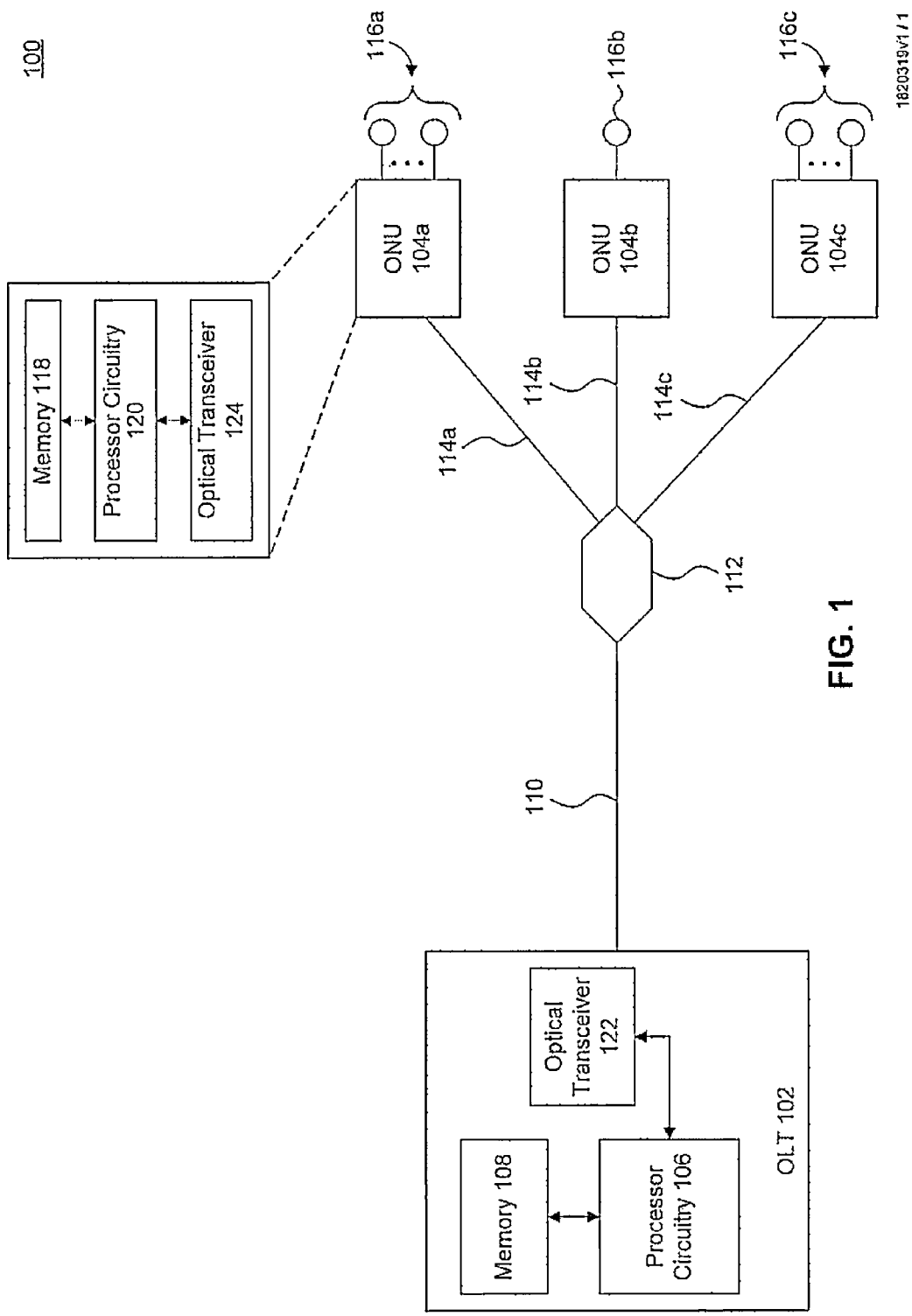
FIG. 1 illustrates an example Passive Optical Network (PON) in which embodiments can be implemented or practiced.

FIG. 1 illustrates an example PON 100 in which embodiments can be practiced or implemented. Example PON 100 is provided for the purpose of illustration only and is not limiting of embodiments. As shown in FIG. 1, example PON 100 includes an OLT 102 and a plurality of Optical Network Units (ONUs) 104a, 104b, and 104c.

ONUs 104a, 104b, and 104c are coupled to OLT 102 via respective optical links 114a, 114b, and 114c, a splitter 112, and a shared optical link 110. ONUs 104a, 104b, and 104c can each serve one or more subscriber devices. For example, as shown, ONU 104a serves a plurality of subscriber devices 116a, ONU 104b serves a single subscriber device 116b, and ONU 104c serves a plurality of subscriber devices 116c.

In an embodiment, OLT 102 includes, without limitation, processor circuitry 102, a memory 108, and an optical transceiver 122. Memory 108 can store logic instructions for execution by processor circuitry 106 in order to perform the OLT functions described herein. Optical transceiver 122 includes an optical transmitter and receiver for transmitting and receiving optical signals over optical link 110. Similarly, in an embodiment, each of ONUs 104a, 104b, and 104c can include, without limitation, processor circuitry 120, a memory 118, and an optical transceiver 124. Memory 118 can store logic instructions for execution by processor circuitry 120 in order to perform the ONU functions described herein.

Figure 2:
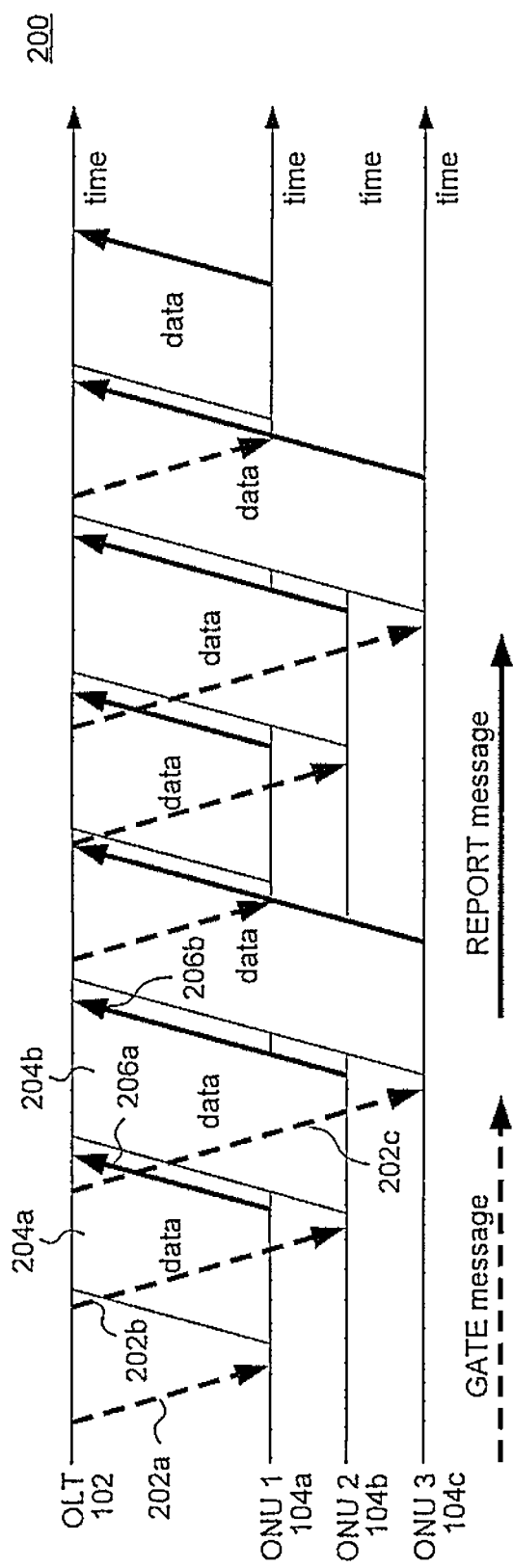
FIG. 2 illustrates the operation of a PON according to a periodic polling mode.

Today, the majority of PON deployments implement Time Division Multiple Access (TDMA) to allow multiple ONUs to share an upstream optical link (e.g., shared optical link 110) for communication with an OLT. Specifically, a periodic polling scheme is implemented to allocate upstream time grants to ONUs as illustrated in FIG. 2. For the purpose of illustration only, the periodic polling scheme is illustrated in FIG. 2 with respect to example PON 100. However, this should not be used to limit the embodiments described herein.

As shown in FIG. 2, in the downstream, OLT 102 periodically sends GATE messages 202a, 202b, and 202c to ONUs 104a, 104b, and 104c, respectively. Each GATE message includes a unicast Logical Link Identifier (LLID) of the intended ONU, and indicates an upstream time grant, defined by an upstream transmission start time and an upstream transmission duration. In response to the GATE message, the ONU transmits a data burst followed by a REPORT message in accordance with the upstream time grant. For example, ONU 104a responds to GATE message 202a by transmitting a data burst 204a followed by a REPORT message 206a. Similarly, ONU 104b responds to GATE message 202b by transmitting a data burst 204b followed by a REPORT message 206b, and so on.

The REPORT message indicates to the OLT the amount of data (e.g., bytes) that remain to be sent at the ONU, and is typically sent regardless of whether the ONU has any remaining data. If the ONU has remaining data to send, the subsequent GATE message sent to the ONU specifies an upstream time grant large enough (up to a maximum upstream time grant size) to accommodate the transmission of the remaining data from the ONU to the OLT. Otherwise, the subsequent GATE message specifies an upstream time grant that is only large enough to accommodate the transmission of another REPORT message from the ONU to the OLT.

A consequence of this periodic polling reporting scheme is that GATE messages are constantly transmitted in the downstream and corresponding REPORT messages are constantly transmitted in the upstream even when an ONU has no upstream data traffic (idle ONU). While the downstream/upstream transmission times of GATE/REPORT messages are relatively short, the transmissions can consume a considerable amount of bandwidth and power, particularly when multiple ONUs are present. This is also because upstream REPORT messages have a significant burst overhead as illustrated in FIG. 3 described below.

Figure 3:
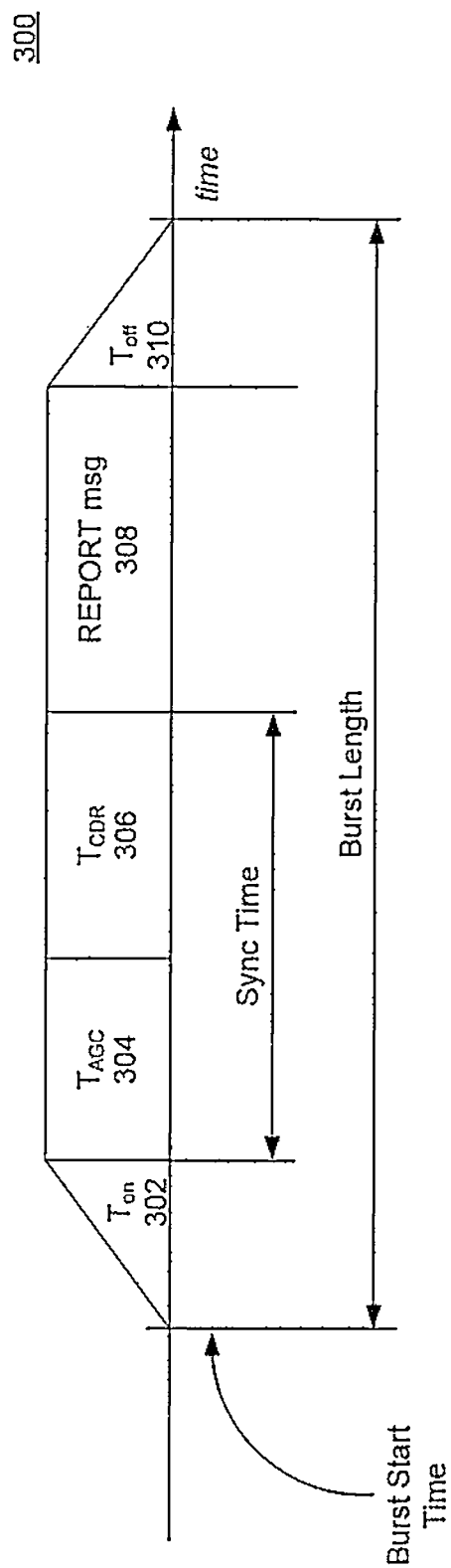
FIG. 3 illustrates an example upstream burst to transmit a REPORT message by an Optical Network Unit (ONU).

FIG. 3 illustrates an example upstream burst to transmit a REPORT message by an ONU. As shown in FIG. 3, the upstream burst includes a laser on time $T_{ON}$ 302, an Automatic Gain Control (AGC) time $T_{AGC}$ 304, a Clock and Data Recovery (CDR) time $T_{CDR}$ 306, a REPORT message transmission time 308, and a laser off time $T_{OFF}$ 310. During $T_{AGC}$ 204 and $T_{CDR}$ 306, the ONU transmits a synchronization preamble which allows the OLT to properly receive the REPORT message subsequently transmitted during time 208. As shown in FIG. 3, the transmission time of the synchronization preamble can be larger than transmission time 308 of the REPORT message itself, resulting in a very large overhead (in terms of bandwidth and power) associated with the sending of REPORT messages in the upstream. Similarly, the OLT incurs significant cost in terms of processing power to receive and process the REPORT messages.

With the servicing of idle ONUs consuming substantial resources in periodic polling, the performance of the PON system can be degraded, with active ONUs experiencing higher latency. Embodiments, as further describe below, provide systems and methods for a probabilistic reporting mode, where an ONU sends a REPORT message only when it has data to transmit. The absence of a REPORT message from an ONU is treated by the OLT as indicating absence of data to transmit at the ONU. In another aspect, embodiments include systems and methods for an unsolicited burst mode, where an ONU can be configured to transmit data in the upstream unsolicited. i.e., without being in response to a dedicated GATE message or a shared GATE message. The unsolicited burst mode, as further described below, includes mechanisms to ensure that no data is lost due to potential collisions between ONUs.

The probabilistic reporting mode will now be described with reference to FIGS. 4-8. In probabilistic reporting mode, the OLT suspends periodic polling for one or more or all ONUs in the PON. Instead, the OLT generates and transmits, periodically, a shared GATE message in the downstream. Unlike the GATE message used in periodic polling, which is a unicast message directed to a single particular LLID and which is read only by the ONU associated with the particular LLID, the shared GATE message includes a broadcast LLID and, as such, is read by all ONUs in the PON. In an embodiment, the shared GATE message specifies a shared upstream time grant (upstream transmission time, upstream transmission duration) during which any ONU that receives the shared GATE message can respond with a REPORT message. This can include, for example, an ONU that was previously idle and that now has data to transmit. The ONU can transmit a REPORT message in the shared upstream time grant without needing a dedicated GATE message that schedules the REPORT message.

Figure 4:
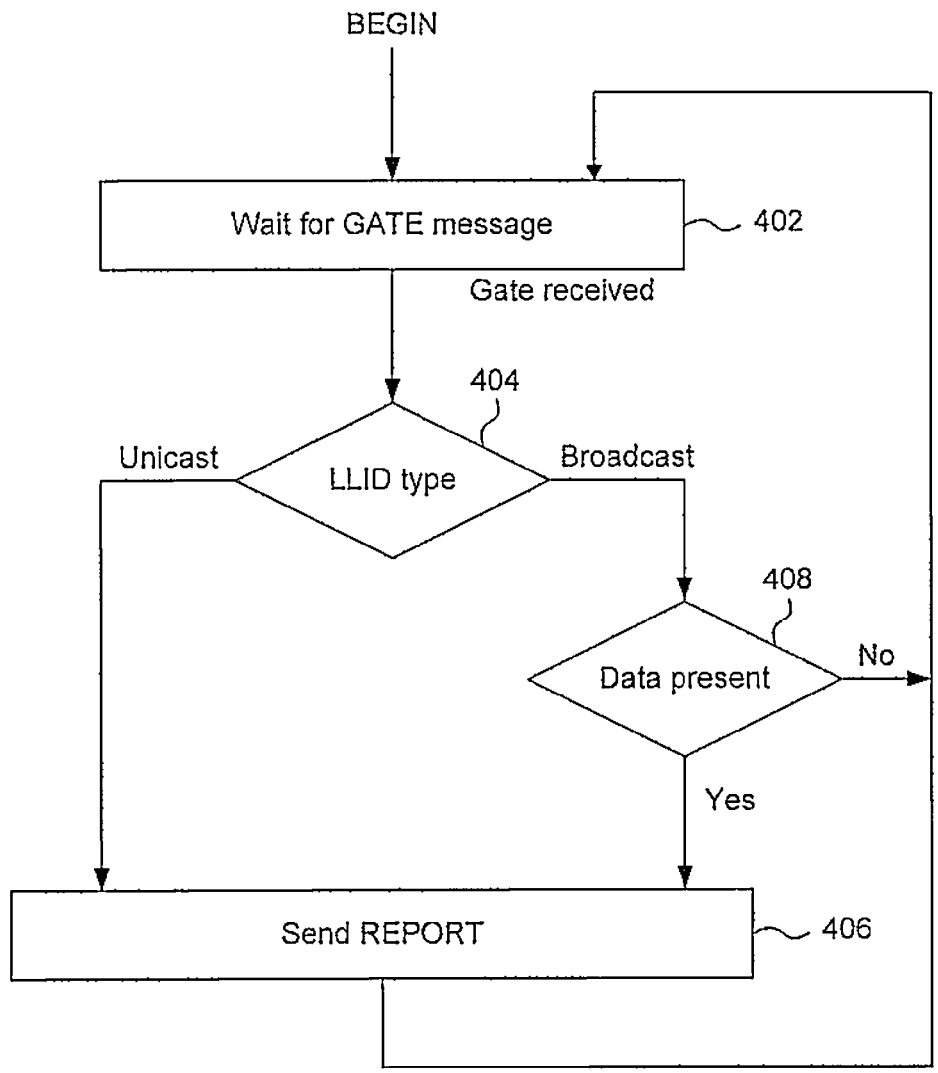
FIG. 4 illustrates an example process according to an embodiment.

FIG. 4 illustrates an example process 400 according to an embodiment. Example process 400 is provided for the purpose of illustration only and is not limiting of embodiments. Example process 400 can be performed by an ONU, such as ONU 104a. 104b, or 104c, in a PON implementing a probabilistic reporting mode. It is noted that the OLT may continue to perform periodic polling for some ONUs at the same time that probabilistic reporting is implemented. Example process 400 corresponds to a process performed by an ONU in such a PON.

As shown in FIG. 4, process 400 begins in step 402 which includes waiting to receive a GATE message. When a GATE message is received, process 400 proceeds to step 404, which includes determining whether the GATE message includes a unicast or a broadcast LLID type. If the GATE message includes a unicast LLID (and the unicast LLID is associated with the ONU), process 400 proceeds to step 406 which includes sending a REPORT message in response to the GATE message. This corresponds to the case in which the GATE message is due to periodic polling by the OLT. The ONU sends the REPORT message regardless of whether it has data to transmit in the upstream.

Otherwise, if the GATE message includes a broadcast LLID, process 400 proceeds to step 408, which includes determining whether data is present for upstream transmission to the OLT. If not (e.g., the ONU is idle), process 400 returns to step 402. Otherwise, if data is present, process 400 proceeds to step 406, which includes sending a REPORT message in response to the GATE message. This corresponds to when the GATE message is a shared GATE message according to the probabilistic reporting mode. The REPORT message is sent in the shared upstream time grant specified by the shared GATE message.

According to process 400, idle ONUs do not send any REPORT messages if the OLT suspends periodic polling for them. As such, significant polling and reporting resources can be saved. And in the case that the ONUs are generally idle, the probability of collision between REPORT messages in the shared upstream time grant is very low. However, a busy ONU (an ONU with queued data) will respond to every shared GATE message, even if the OLT is already aware of its queue status and intends to issue it a dedicated grant to transmit its data. This can be inefficient especially when multiple busy ONUs are present, such that the probability of REPORT collision increases.

In another embodiment, the OLT can limit probabilistic reporting to subsets of ONUs as desired. For example, the OLT can configure only ONUs that are idle or that have low upstream traffic in probabilistic reporting mode. As such, only such configured ONUs will respond to shared GATE messages. In an embodiment, the ONU maintains a probabilistic reporting mode state, which can be set to true/false to enable/disable the probabilistic reporting mode at the ONU. In another embodiment, the OLT uses a field of the GATE message to signal a reporting flag to the ONU. When the reporting flag is set (e.g., 1), the ONU operates in periodic polling mode and disables the probabilistic reporting mode if previously enabled. Otherwise, when the reporting flag is not set, the ONU operates in probabilistic reporting mode and enables the probabilistic reporting mode if previously disabled.

Figure 5:
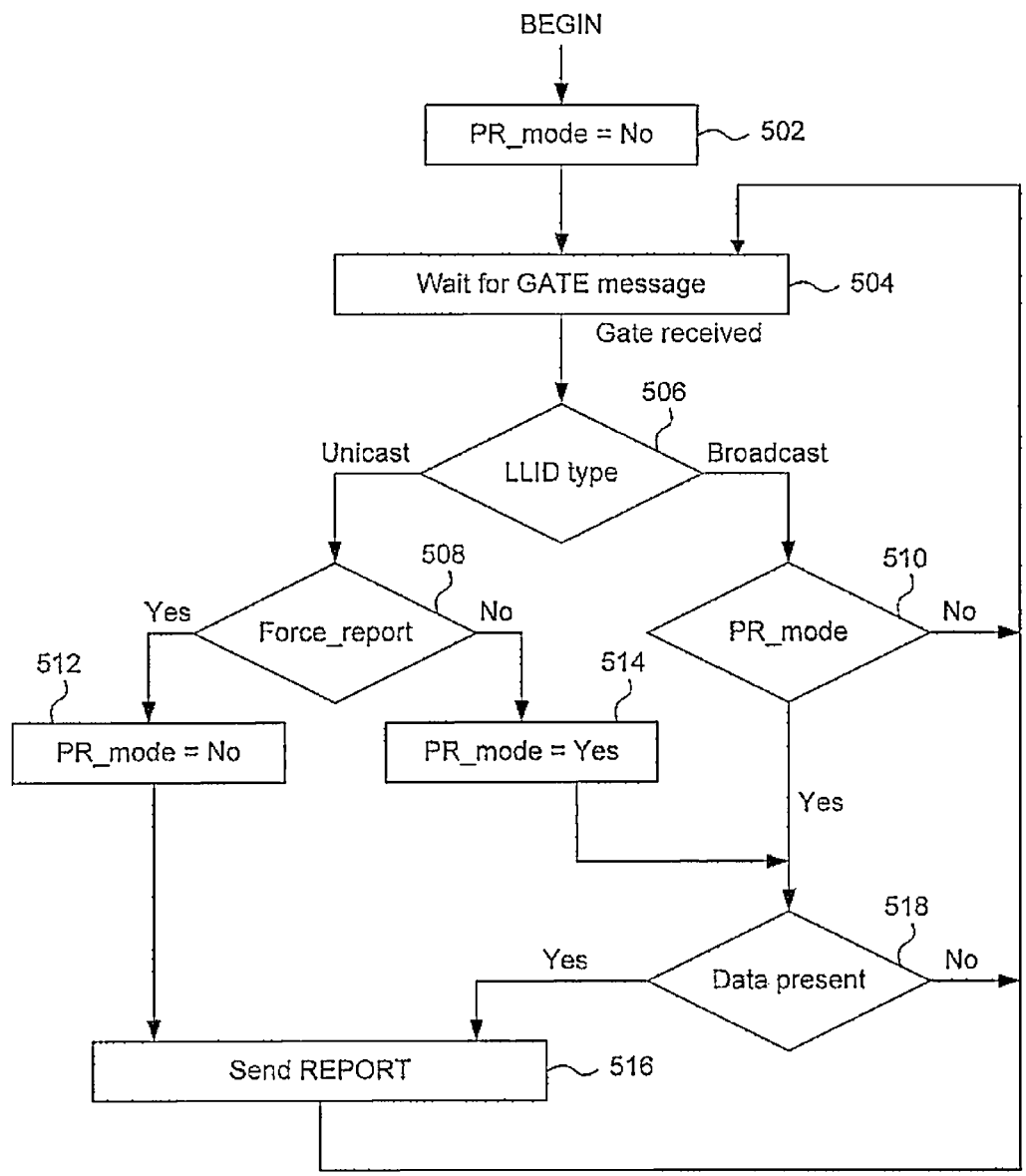
FIG. 5 illustrates another example process according to an embodiment.

FIG. 5 illustrates an example process 500 according to an embodiment. Example process 500 is provided for the purpose of illustration only and is not limiting of embodiments. Example process 500 can be performed by an ONU, such as ONU 104a, 104b, or 104c, in a PON implementing probabilistic reporting as described above.

As shown in FIG. 5, process 500 begins in step 502, which includes setting the probabilistic reporting mode state (PR_mode) of the ONU to false (No) to disable the probabilistic reporting mode at the ONU. Subsequently, process 500 proceeds to step 504, which includes waiting to receive a GATE message from an OLT.

When a GATE message is received, process 500 proceeds to step 506, which includes determining whether the GATE message includes a unicast or a broadcast LLID type. In another embodiment, as further described below, shared GATE messages can have a multicast LLID type, instead of or in addition to broadcast LLID, and thus step 506 includes determining whether the GATE message is unicast versus broadcast or multicast. In a further embodiment, step 506 further includes using the unicast or broadcast GATE message to maintain its MPCP (Multipoint Control Protocol) clock synchronization.

If the GATE message includes a unicast LLID (and the unicast LLID is associated with the ONU), process 500 proceeds to step 508 which includes determining whether a reporting flag of the GATE message is set. In an embodiment, the reporting flag is signaled in the Force_report field of the GATE message. In the EPON standard, when the Force_report is set in the GATE message, the ONU is required to send a REPORT message in the corresponding grant.

If the reporting flag is set (Force_report=Yes), process 500 proceeds to step 512, which includes setting the PR_mode of the ONU to false to disable the probabilistic reporting mode at the ONU if the PR mode is enabled. Then, process 500 proceeds to step 516, which includes transmitting a REPORT message to the OLT in response to the GATE message, before returning to step 504. It is noted that in this case the ONU transmits the REPORT message regardless of whether it has data available for upstream transmission to the OLT.

If the reporting flag is not set (Force_report=No), process 500 proceeds to step 514, which includes setting the PR_mode of the ONU to true to enable the probabilistic reporting mode at the ONU if the PR mode is disabled. Then, process 500 proceeds to step 518, which includes determining whether data is available for upstream transmission at the ONU. If yes, process 500 proceeds to step 516, which includes sending a REPORT message in response to the GATE message, before returning to step 504. Otherwise, process 500 returns to step 504.

Returning to step 506, if the GATE message includes a broadcast (or multicast) LLID, process 500 proceeds to step 510, which includes determining whether the probabilistic reporting mode of the ONU is enabled or disabled by checking the PR_mode state. If the probabilistic reporting mode is disabled (PR_mode false), process 500 returns to step 504. Otherwise, process 500 proceeds to step 518, where the ONU determines if it has data available for upstream transmission as described above.

According to example processes 400 and 500, an idle ONU operating in probabilistic reporting mode will not transmit any REPORT messages to the OLT. In an embodiment, to accommodate the MPCP keep-alive mechanism, the ONU can be further configured to periodically transmit a REPORT message. The REPORT message can be transmitted at a very low rate only as necessary for the purpose of the MPCP keep-alive mechanism.

According to embodiments, the OLT can detect collisions between REPORT messages transmitted by different ONUs in the same upstream window allocated by a shared GATE message. For example, a collision can result in corrupted REPORT messages at the OLT. In an embodiment, when the OLT detects excessive collisions (e.g., N consecutive timeslots with collisions), the OLT can switch some of the ONUs to periodic polling mode to allow them to transmit their queued data in the upstream. Similarly, if collisions are low, the OLT can configure more ONUs for probabilistic reporting.

As described above, in example process 500, the ONU sets (enables/disables) its probabilistic reporting mode in response to a unicast GATE message transmitted by the OLT. As such, the OLT controls the ONU's configuration in probabilistic reporting mode. However, embodiments are not limited as such. For example, in other embodiments, the ONU can set its probabilistic reporting mode independently of the OLT. For example, the ONU can examine its own upstream transmission queue and set its probabilistic reporting mode accordingly. The ONU can then stop responding to unicast GATE messages from the OLT to signal to the OLT that it entered probabilistic reporting mode, and the OLT can suspend periodic polling to the ONU in response. In another embodiment, the ONU can set its probabilistic reporting mode based on a time of day or based on current traffic type.

As mentioned above, in other embodiments, example processes 400 and 500 can be implemented using multicast GATE messages for enabling probabilistic reporting in the PON. Unlike broadcast GATE messages, which are visible to all ONUs in the PON, multicast GATE messages can be configured to be received by only a subset of the ONUs in the PON, where the subset of the ONUs is associated with the multicast LLID of the GATE message.

Figure 6:
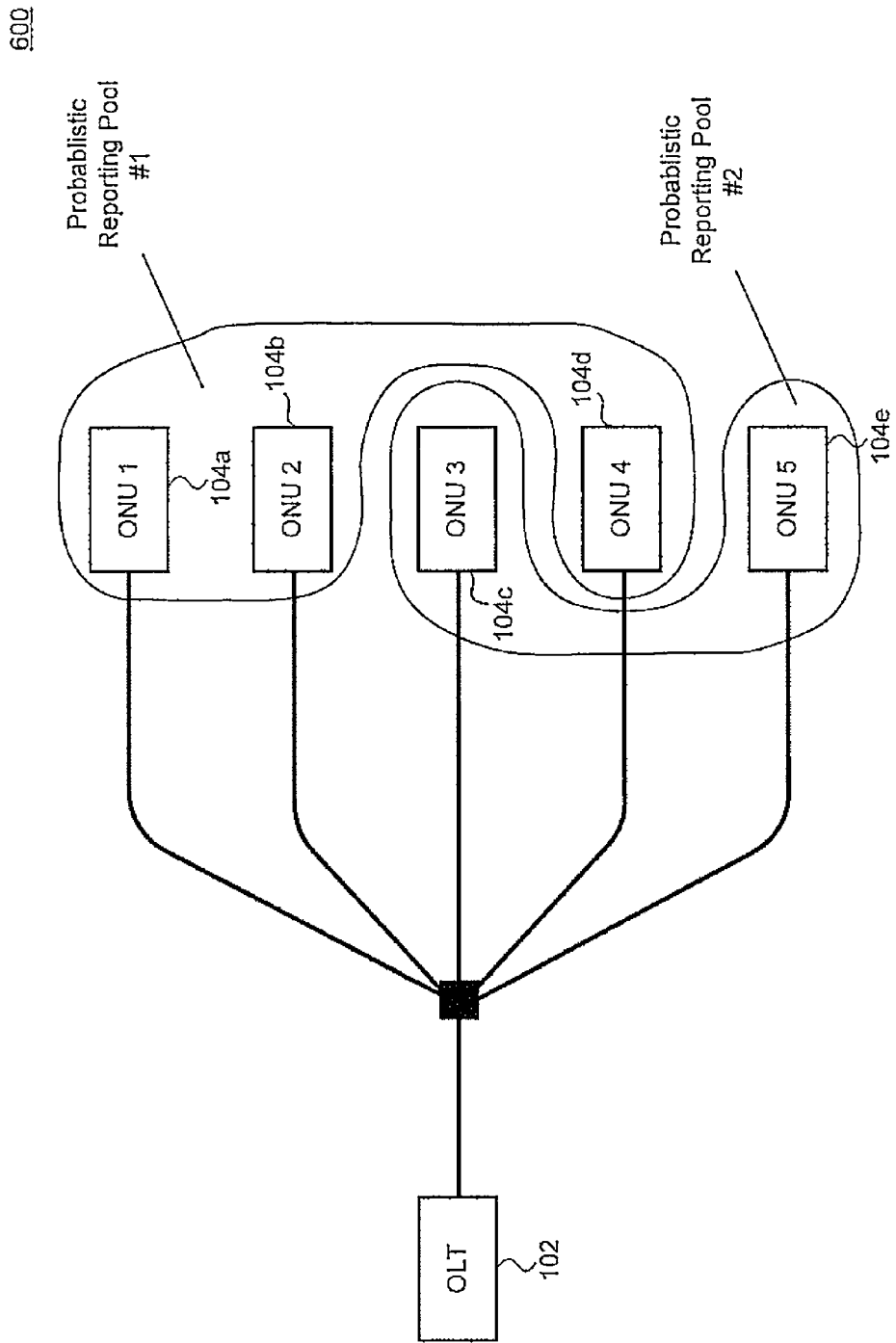
FIG. 6 illustrates an example grouping of ONUs according to an embodiment.

In an embodiment, using multicast shared GATE messages allows the breaking of the ONU pool in a PON into several groups, with each group responding only to its respective multicast shared GATE message. This is illustrated in FIG. 6, which shows an example PON 600, comprising an OLT 102 and a plurality of ONUs 104a-e. In an embodiment, ONUs 104a, 104b, and 104d, for example, are assigned a first multicast LLID to form a first group, and ONUs 104c and 104e are assigned a second multicast LLID to form a second group. It is noted that an ONU can belong to one or more groups according to embodiments.

In an embodiment. OLT 102 periodically transmits GATE messages with the first multicast LID as well as GATE messages with the second multicast LLID. GATE messages with the first multicast LLID can be responded to by ONUs 104a. 104b, and 104d belonging to the first group (when their respective probabilistic reporting modes are enabled), and GATE messages with the second multicast LLID can be responded to by ONUs 104c and 104c belonging to the second group (when their respective probabilistic reporting modes are enabled). In an embodiment, the two types of GATE messages are transmitted at the same rate. In another embodiment, the two types of GATE messages can be transmitted at different rates. For example, in an embodiment, the first group may correspond to a first class of service (e.g., video), and the second group may correspond to a second class of service (e.g., data). As such. GATE messages with the first multicast LLID can be issued at a higher rate than GATE messages with the second multicast LLID.

By reducing the number of ONUs that can respond to a given shared GATE message, the probability of collisions in the PON is reduced. Another advantage of using multicast shared GATE messages is that a multicast GATE message appears to a legacy ONU like a regular dedicated GATE message intended for another ONU. The legacy ONU would thus simply ignore the message. In contrast, the legacy ONU can understand broadcast LLIDs, and thus would read a broadcast shared GATE message without the ability to process it properly.

In another embodiment, multicast shared GATE messages can be used to break the probabilistic reporting ONU pool based on distance to the OLT, allowing to reduce the upstream window that needs to be reserved in response to a shared GATE message. This is illustrated in the description below with reference to FIGS. 7 and 8.

Figure 7:
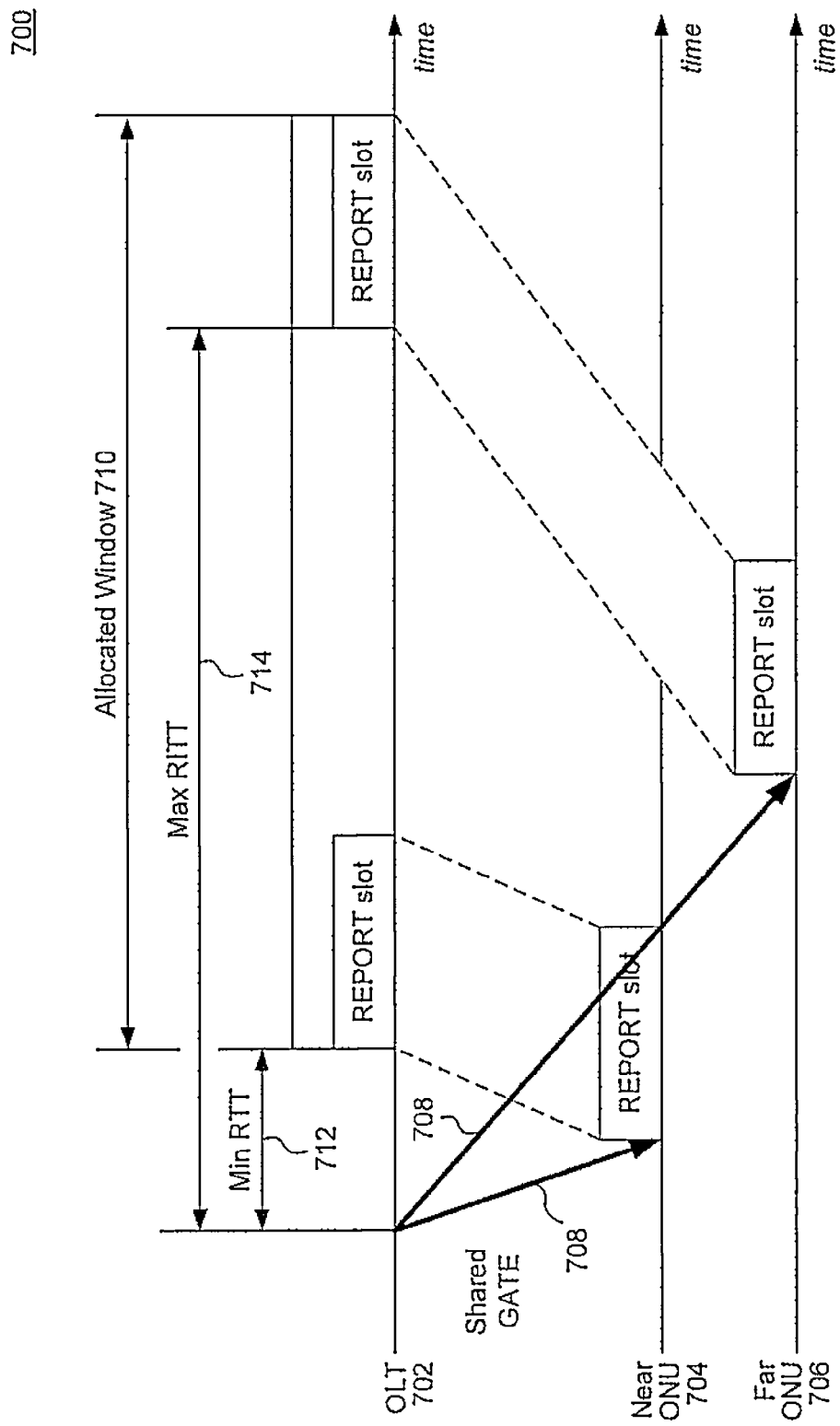
FIG. 7 illustrates an example upstream window allocated for a shared GATE message according to an embodiment.

FIG. 7 is an example 700 that illustrates an upstream window 710 reserved in response to a shared GATE message 708. For illustration only, it is assumed that the PON includes an OLT 702, a near ONU 704, and a far ONU 706. The PON can also include other ONUs not shown in FIG. 7. ONU 704 is assumed to be closest in distance to OLT 702 from among available ONUs, and ONU 706 is assumed to be farthest in distance from OLT 702 from among available ONUs. In other words. ONUs 704 and 706 correspond to the ONU pair with the maximum round trip time (RTT) difference among all available ONUs.

As shown in FIG. 7. OLT 102 transmits shared GATE message 708 to both ONU 704 and ONU 706. The shared GATE message 708 can be broadcast or multicast. Being closer to OLT 702, ONU 704 receives GATE message 708 before ONU 706. If ONU 704 has data to transmit. ONU 704 will transmit a REPORT message in response to GATE message 708. The REPORT message from ONU 704 will be received by OLT 702 after a minimum RTT 712 (corresponding to the RTT between OLT 702 and ONU 704) from the transmission of GATE message 708. Similarly, if ONU 706 has data to transmit, ONU 706 will transmit a REPORT message, which will be received by OLT 702 after a maximum RTT 714 (corresponding to the RTT between OLT 702 and ONU 706) from the transmission of GATE message 708.

Because any one or both of ONUs 704 and 706 may respond to GATE message 708, OLT 702 must ensure that allocated window 710 is generally equal to W=REPORT timeslot size+(Max RTT−Min RTT), as shown in FIG. 7. In other words, allocated window 710 must account for the maximum RTT difference in the PON. It is noted that this example assumes that ONU 704 and 706 begin transmission of their respective REPORT messages at the same value of their local MPCP clocks, such that the REPORT messages arrive at different times due to different propagation delays.

However, bandwidth can be wasted by this reservation approach, since ONU 704 and ONU 706 may not always have data to transmit in response to a GATE message. For example, in some cases, only one ONU may have data to transmit in response to the GATE message. Yet, this approach would still allocate a very large window to accommodate the case that both ONUs 704 and 706 transmit in response to the GATE message.

Figure 8:
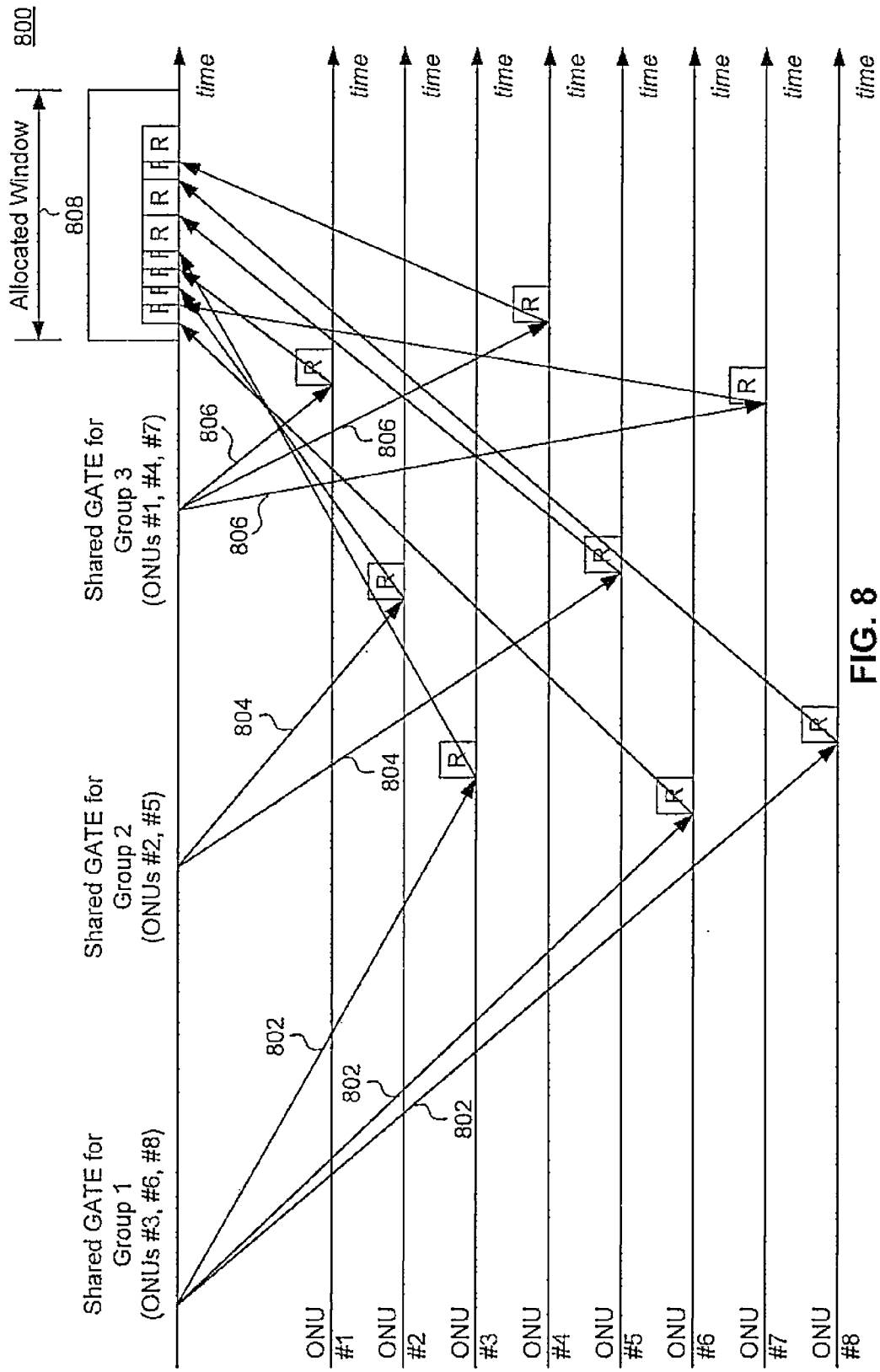
FIG. 8 illustrates an example scheme to reduce the upstream window allocated for a shared GATE message according to an embodiment.

In an embodiment, to reduce the upstream window that needs to be reserved for shared GATE messages. ONUs in the PON are divided into multiple groups based on distance from the OLT, and a multicast LLID is assigned to each group. The OLT transmits separate multicast shared GATE messages for each group. FIG. 8 is an example 800 that illustrates this embodiment with respect to an example PON having 8 ONUs (ONU #1, ONU #2, . . . , ONU #8). The OLT creates three groups based on distance from the OLT, where each group includes ONUs that are of similar distance (RTT) from the OLT. For example, a first group includes ONUs #3, #6, and #8, a second group includes ONUs #2 and #5, and a third groups includes ONUs #1, #4, and #7.

As shown in FIG. 8, the OLT issues separate multicast shared GATE messages 802, 804, and 806 to the first group, second group, and third group respectively. Within each group, the multicast shared GATE message is received at substantially the same time by the ONUs in the group. Assuming that the ONUs all transmit at the same value of their respective local MPCP clocks (assuming all have data to transmit), their respective transmissions will be received densely together (within a short window) at the OLT as shown in FIG. 8. More specifically, the window that must be reserved for transmission by a group is equal to the REPORT timeslot size plus the maximum RTT difference of the group, which is a small value because the ONUs have similar RTT from the OLT.

In an embodiment, the OLT can configure multicast shared GATE messages 802, 804, and 806 (e.g., by setting their respective upstream transmission times) so that each group of ONUs responds in a separate window. The OLT would thus reserve a separate upstream window for each group. In another embodiment, the OLT can configure multicast shared GATE messages 802, 804, and 806 so that one or more of or all ONU groups respond within the same reserved window. For example, as shown in FIG. 8, GATE messages 802, 804, and 806 can be configured such that all ONUs respond within a reserve upstream window 808.

In another embodiment. e.g., if the ONUs cannot be grouped based on distance, the OLT can transmit a shared GATE message to each ONU having a respective upstream transmission time configured to cause a REPORT message from the ONU to be received in a common window at the OLT. For example, the common window can be just equal to the REPORT timeslot size. All ONUs configured for probabilistic reporting would thus attempt to report in the same common window.

Figure 9:
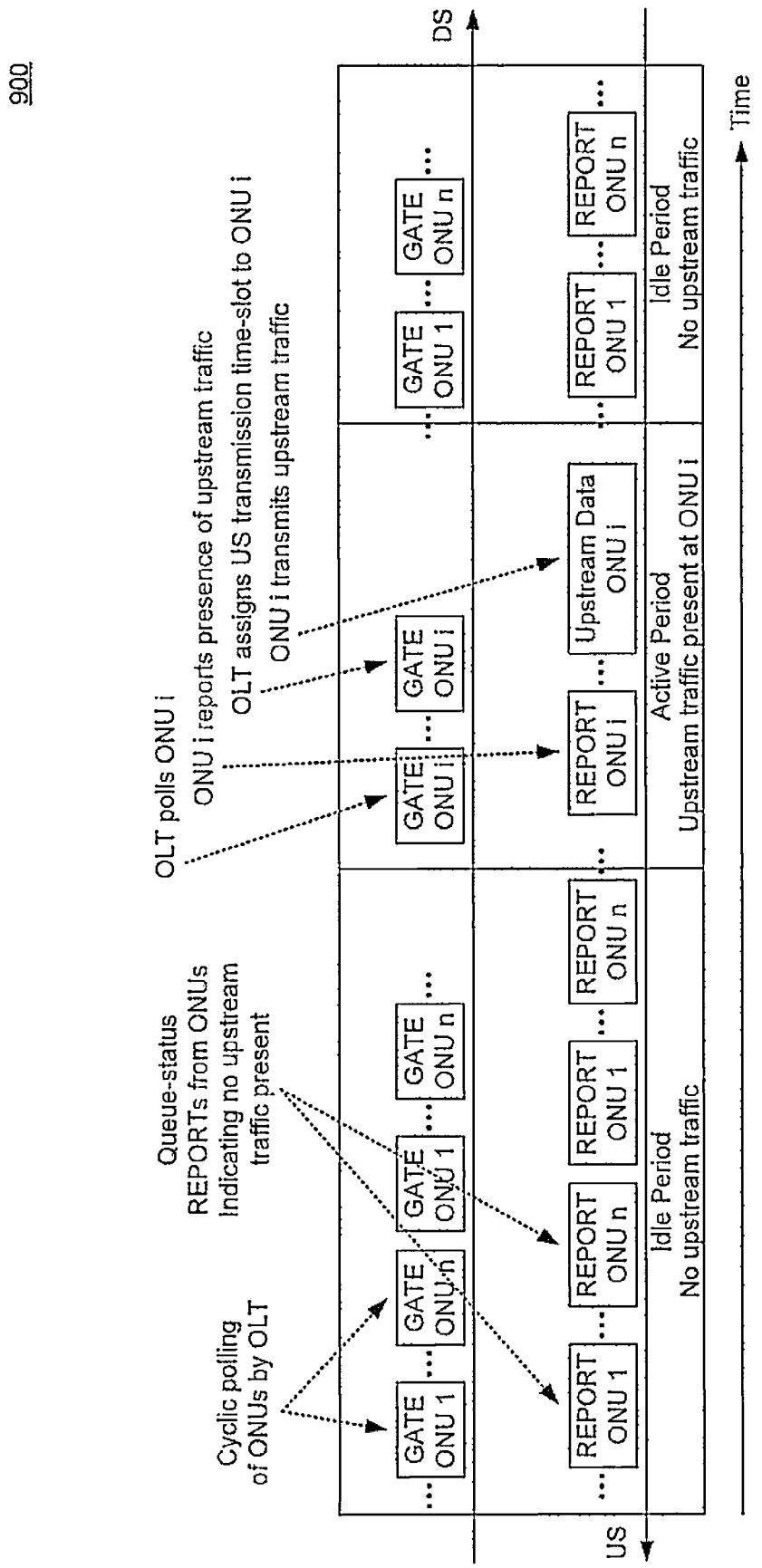
FIG. 9 illustrates the operation of a PON according to the periodic polling mode.

As described above, in another aspect, embodiments include systems and methods for an unsolicited burst mode, where an ONU can be configured to transmit data in the upstream unsolicited, i.e., without being in response to a dedicated GATE message or a shared GATE message. Example embodiments of the unsolicited burst mode are described below with reference to FIGS. 10-12. For illustration only, the periodic polling mode used by current PON systems is first described with reference to FIG. 9. As shown in FIG. 9, and as described above, in the periodic polling mode, the ONU cyclically polls available ONUs using dedicated GATE messages. Each ONU responds with a REPORT message to its respective dedicated GATE message. This is the case even when an ONU is idle and has no upstream traffic. If the ONU reports presence of data traffic in the first REPORT message after becoming active, the OLT sends another dedicated GATE message to the ONU, allocating an upstream transmission slot to the ONU. The ONU can then send its data in the allocated upstream transmission slot, followed by a REPORT message as described above with reference to FIG. 2. As mentioned above, the periodic polling mode is wasteful when a vast majority of ONUs are idle.

Figure 10:
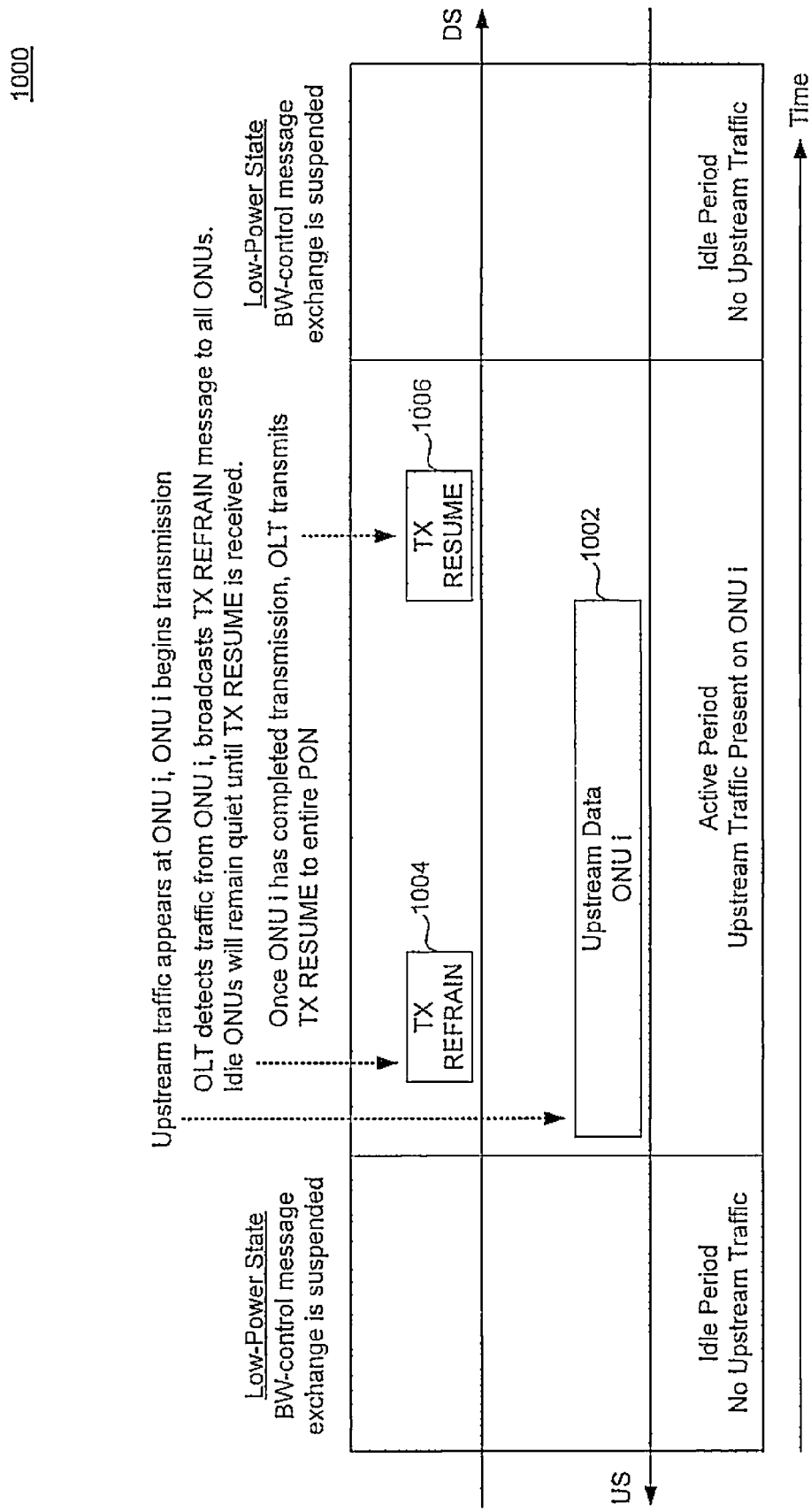
FIG. 10 illustrates an example operation of a PON according to an embodiment.

FIG. 10 illustrates an example operation of a PON in the unsolicited burst mode according to an embodiment. This example is provided for the purpose of illustration only and is not limiting of embodiments. OLT operations described in FIG. 10 can be performed by an OLT, such as OLT 102 described above in FIG. 1. ONU operations described in FIG. 10 can be performed by an ONU, such as ONUs 104 described above in FIG. 1.

As shown in FIG. 10, in an embodiment, according to the unsolicited burst mode, the OLT suspends bandwidth control message exchange during idle periods of the PON. This includes suspending the downstream transmission of GATE messages, which results in no REPORT messages being transmitted in the upstream. The PON is thus operated in a low power state.

When upstream data traffic becomes available at any ONU, the ONU begins transmission in the upstream in an unsolicited burst. For example, as shown in FIG. 10, ONU$_i$ begins a transmission 1002 in an unsolicited manner as soon as it has data available. When the OLT detects transmission 1002 from ONU$_i$, the OLT broadcasts a TX REFRAIN message 1004 in the downstream. The TX REFRAIN message 1004 is received by all ONUs. All ONUs except ONU$_i$ remain quiet in response to TX REFRAIN message 1004 until a TX RESUME message 1006 is broadcast by the OLT when ONU$_i$ has terminated its transmission 1002.

Figure 11:
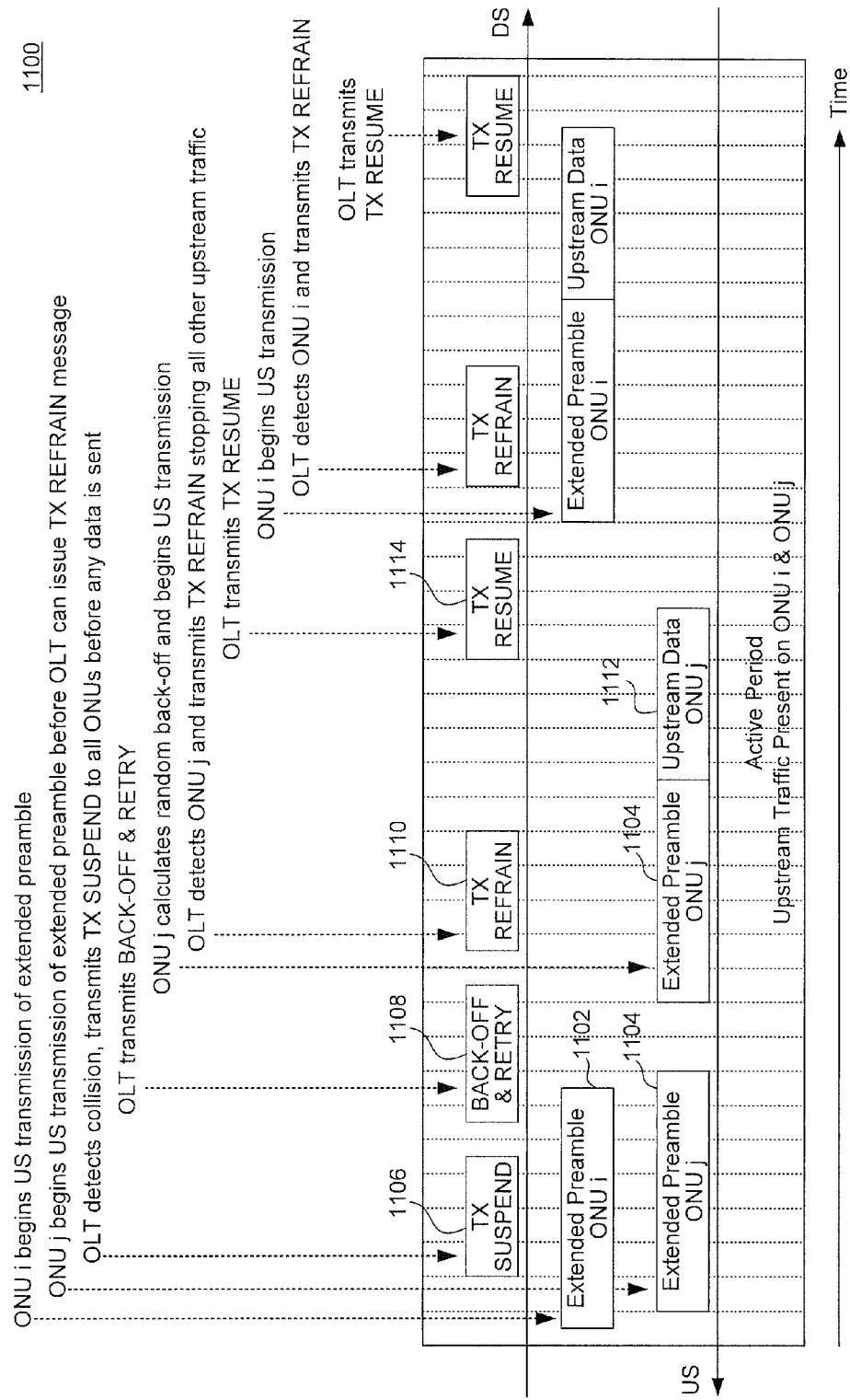
FIG. 11 illustrates an example operation of a PON according to an embodiment.

However, in some cases, another ONU may begin transmitting after ONU$_i$ but before the OLT transmits the TX REFRAIN message 1004. To avoid data collisions, in another embodiment, as illustrated in FIG. 11, the unsolicited burst mode also includes a collision detection and management mechanism to mediate among multiple ONUs attempting simultaneous upstream transmission. According to this mode, the ONU is configured to prepend its transmission with an extended preamble. The extended preamble is configured to be long enough that the OLT can detect collisions between any two or more ONUs before any one ONU has begun transmitting data traffic. In another embodiment, the extended preamble can be replaced with a transmission request message, to which the OLT can respond with a clear to send message.

For example, in FIG. 11, it is assumed that ONU$_j$ begins transmission after ONU$_i$ but before the OLT has transmitted a TX REFRAIN message. However, in this embodiment, ONU$_i$ and ONU$_j$ begin by transmitting respective preambles 1102 and 1004 instead of data traffic. When the OLT detects the collision of the preambles, the OLT broadcasts a TX SUSPEND message 1106 in the downstream, suspending any upstream transmission on the PON. Both ONU$_i$ and ONU$_j$ stop their respective transmissions in response to TX SUSPEND message 1106.

Subsequently, the OLT sends a BACK-OFF and RETRY message 1108. In response to BACK-OFF and RETRY message 1108, each ONU with data available calculates a random back-off time and begins transmission after the random backoff time. In the example of FIG. 11, ONU$_j$ begins transmission first in response to BACK-OFF and RETRY message 1108 and with no other contending ONU such that the OLT can detect extended preamble 1004 and can broadcast a TX REFRAIN message 1110 in the downstream. TX REFRAIN message 1110 reserves the upstream to ONU$_j$, which can complete its transmission of preamble 1104 followed by a data burst 1112.

After ONU$_j$ terminates its transmission, the OLT broadcasts a TX RESUME message 1114, which re-opens the upstream to all ONUs. ONU$_i$ can then capture the upstream as shown in FIG. 11 to transmit its data in the same manner described above with respect to FIG. 10.

In a further embodiment, the unsolicited burst mode can also include a pre-emption mechanism which can be used to protect time-sensitive traffic, enforce Service Level Agreements (SLAs) and Quality of Service (QoS) requirements, improve efficiency, and/or ensure fairness between ONUs. This illustrated in FIG. 12, which shows an example of the unsolicited burst mode where the pre-emption mechanism is used for QoS enforcement.

Figure 12:
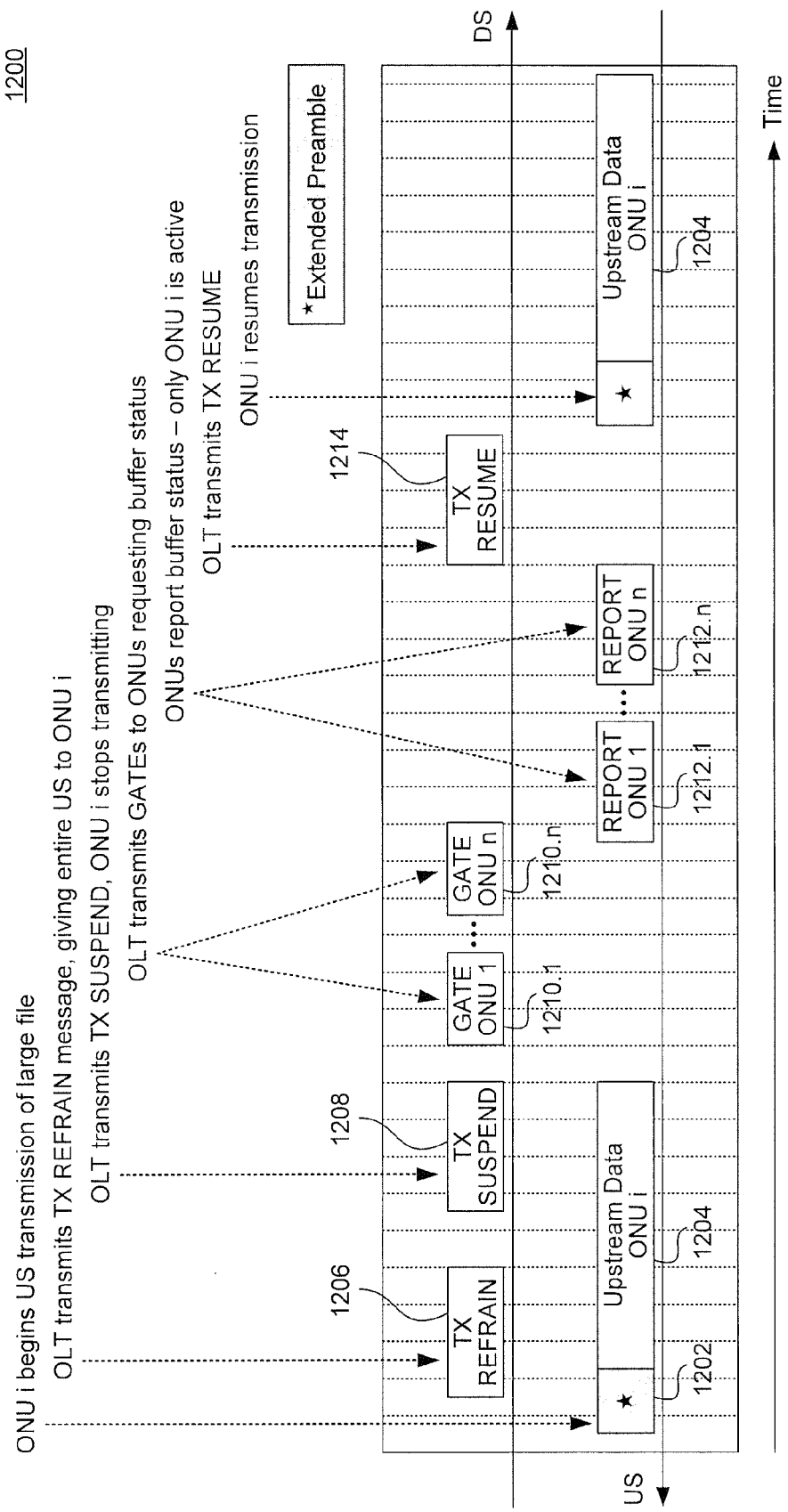
FIG. 12 illustrates an example operation of a PON according to an embodiment.

As shown in FIG. 12, the example begins with an ONU$_i$ beginning an upstream transmission 1204 of a large file, for example. The OLT detects a preamble 1202 preceding transmission 1204 and broadcasts a TX REFRAIN message 1206, reserving the upstream to ONU$_i$. To prevent ONU$_i$ from monopolizing the upstream for a long time, the OLT sends a TX SUSPEND message 1208 after a predetermined duration of continuous upstream transmission by ONU$_i$.

ONU$_i$ stops transmitting in response to the TX SUSPEND message 1208. The OLT then performs a period of periodic polling of the other ONUs. For example, as shown in FIG. 12, the OLT may send dedicated GATE messages 1210.1-1210.n to the ONUs requesting queue status. The ONUs respond with respective REPORT messages 1212.1-1212.n to the GATE messages. In another embodiment, some of the ONUs may be configured in probabilistic reporting mode, and the OLT may send shared GATE messages to those ONUs. If any of the ONUs has data to transmit, the OLT can send a subsequent GATE message to the ONU allocating an upstream transmission slot and the ONU can transmit its data in the allocated upstream transmission slot. In another embodiment, instead of performing the periodic polling directly, the OLT can send a TX RESUME message and can monitor for upstream collisions, indicating the presence of upstream traffic at more than one ONU. If collisions are detected, the OLT can broadcast a TX SUSPEND message, and then poll the ONUs.

Once the other ONUs have had an opportunity to transmit in the upstream, the OLT sends a TX RESUME message 1214, which allows ONU$_i$ to resume its transmission 1204. In an embodiment, upon receipt of TX SUSPEND message 1208. ONU$_i$ may stop transmission at a packet boundary or at a byte or n-byte boundary.

According to embodiments, probabilistic reporting, unsolicited burst, and/or periodic polling modes can be used together in a single PON, where a first set of ONUs can be configured for probabilistic reporting, a second set of ONUs can be configured for unsolicited burst, and/or a third set of ONUs can operate according to periodic polling. In an embodiment, the configuration is applied on an LLID basis, where multiple LLIDs associated with the same ONU can each be configured for a respective mode independent of other LLIDs. Configuration can be performed at the control of the OLT or by the ONU independent of the OLT. In the following, a few example configuration scenarios are described with reference to example PON 100 of FIG. 1. These example configuration scenarios are provided for the purpose of illustration only and are not limiting of embodiments. For instance, the example scenarios describe configurations being performed at the control of the OLT. In other embodiments, the same configurations can be implemented by the ONU independent of control by the OLT. In addition, as described above, each of these configurations can be applied on an ONU basis or on an LLID basis.

In an embodiment, OLT 102 can selectively configure any one of ONUs 104a, 104b, and 104c into probabilistic reporting mode, unsolicited burst mode, or periodic polling mode based on its respective level of upstream activity. For example, in an embodiment, processor circuitry 106 of OLT 102 can be configured to determine an upstream activity level of ONU 104a, and to transmit a unicast GATE message to ONU 104a designed to set the reporting mode of ONU 104a in response to the determined upstream activity level of ONU 104.

In one embodiment, the unicast GATE message can be configured to set the reporting mode of the ONU 104a to the probabilistic reporting or the unsolicited burst mode when the upstream activity level of ONU 104a is below a threshold, and to set the reporting mode of ONU 104a to the periodic polling mode when the upstream activity level of ONU 104a is above the threshold. In an embodiment, processor circuitry 106 can determine whether ONU 104a reported no upstream data available in the last N (e.g., 10) REPORT messages and can determine whether the upstream activity level is above or below the threshold accordingly. In another embodiment, the upstream activity level of the ONU 104a corresponds to a first LLID of a plurality of LLIDs associated with the ONU 104a, and as such the first unicast GATE message configures the reporting mode of ONU 104a for only the first LLID.

Independently of the configuration of ONU 104a, OLT 102 can configure ONU 104b and/or ONU 104c based on their respective levels of upstream activity. For example, OLT 102 may determine that ONU 104b has been idle and can configure it for probabilistic reporting mode, and that ONU 104c has been busy and can configure it for periodic polling mode. Other possible configurations according to embodiments should be apparent to a person of skill in the art based on the teachings herein.

In another embodiment, OLT 102 can selectively configure any one of ONUs 104a, 104b, and 104c into probabilistic reporting mode, unsolicited burst mode, or periodic polling mode based on a priority associated with its upstream traffic. For example, in an embodiment, processor circuitry 106 of OLT 102 can be configured to determine a priority of upstream traffic of ONU 104b, and to transmit a unicast GATE message to ONU 104b designed to set the reporting mode of ONU 104b in response to the priority of upstream traffic of ONU 104b.

For example, upstream data traffic can be categorized into a high priority, a medium priority, and a low priority. This categorization can be based on traffic type (e.g., video, voice, data). In an embodiment, ONU 104b is configured for periodic polling when its upstream traffic is of high priority, probabilistic reporting when its upstream traffic is of medium priority, and unsolicited burst when its upstream traffic is of low priority. Other possible configurations according to embodiments should be apparent to a person of skill in the art based on the teachings herein.

In a further embodiment, OLT 102 can selectively configure any one of ONUs 104a, 104b, and 104c into probabilistic reporting mode, unsolicited burst mode, or periodic polling mode based on a time of day. For example, in an embodiment, processor circuitry 106 of OLT 102 can be configured to determine the time of day, and to transmit a unicast GATE message to ONU 104c designed to set the reporting mode of ONU 104c in response to the time of day. For example, OLT 102 may configure ONU 104c for probabilistic reporting or probabilistic reporting beginning at midnight and then re-configure it for periodic polling at 7 AM. Other possible configurations according to embodiments should be apparent to a person of skill in the art based on the teachings herein.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:
1. An Optical Network Unit (ONU), comprising:
   a memory that stores logic instructions; and
   processor circuitry configured, by executing the logic instructions, to:
      receive a GATE message from an Optical Line Terminal (OLT);
      determine whether the GATE message includes a broadcast Logical Link Identifier (LLID) or a multicast LLID; and
      if the GATE message includes the broadcast LLID or the multicast LLID,
         transmit a REPORT message to the OLT, in response to the GATE message, when a probabilistic reporting (PR) mode is enabled and data is available for upstream transmission at the ONU, wherein the processor circuitry is further configured to set the PR mode at the ONU responsive to the GATE message.

2. The ONU of claim 1, wherein the multicast LLID corresponds to a multicast group including the ONU.

3. The ONU of claim 1, wherein the processor circuitry is further configured to:
determine whether the GATE message includes a unicast LLID;
if the GATE message includes the unicast LLID, determine whether a reporting flag of the GATE message is set; and
if the reporting flag of the GATE message is not set,
enable the PR mode at the ONU if the PR mode is disabled; and
transmit the REPORT message to the OLT, in response to the GATE message, when the data is available for upstream transmission at the ONU.

4. The ONU of claim 3, wherein the processor circuitry is further configured to:
if the reporting flag of the GATE message is set,
disable the PR mode at the ONU if the PR mode is enabled; and
transmit the REPORT message to the OLT in response to the GATE message.

5. The ONU of claim 4, wherein if the reporting flag of the GATE message is set, the processor circuitry is further configured to transmit the REPORT message to the OLT regardless of whether the data is available for upstream transmission at the ONU.

6. An Optical Network Unit (ONU), comprising:
a memory that stores logic instructions; and
processor circuitry configured, by executing the logic instructions, to:
receive a GATE message from an Optical Line Terminal (OLT);
determine whether the GATE message includes a broadcast Logical Link Identifier (LLID) or a multicast LLID; and
if the GATE message includes the broadcast LLID or the multicast LLID,
transmit a REPORT message to the OLT, in response to the GATE message, when a probabilistic reporting (PR) mode is enabled and data is available for upstream transmission at the ONU,
wherein the processor circuitry is further configured to set the PR mode at the ONU independent of the OLT.

7. The ONU of claim 6, wherein the processor circuitry is further configured to set the PR mode at the ONU based on a time of day.

8. The ONU of claim 6, wherein the processor circuitry is further configured to set the PR mode at the ONU based on a status of an upstream transmission queue of the ONU.

9. The ONU of claim 8, wherein the processor circuitry is further configured to set the PR mode at the ONU based on a traffic type in the upstream transmission queue of the ONU.

10. An Optical Line Terminal (OLT) connected to a plurality of Optical Network Units (ONUs) by a shared optical medium, comprising:
a memory that stores logic instructions; and
processor circuitry configured, by executing the instructions, to:
detect a first unsolicited data burst from a first ONU of the plurality of ONUs;
broadcast a TX REFRAIN message in response to detecting the first unsolicited data burst, the TX REFRAIN message instructing other ONUs of the plurality of ONUs to refrain from transmission;
broadcast a TX RESUME message when the unsolicited data burst ends;
detect an idle state over the shared optical medium; and
suspend transmission of GATE messages over the shared optical medium in response to the idle state.

11. The OLT of claim 10, wherein the processor circuitry is further configured to:
detect a collision between a second unsolicited burst of a second ONU of the plurality of ONUs and a third unsolicited burst of a third ONU of the plurality of ONUs;
broadcast a TX SUSPEND message in response to detecting the collision, the TX SUSPEND message instructing the plurality of ONUs to refrain from transmission; and
broadcast a BACK-OFF and RETRY message, instructing the plurality of ONUs to attempt transmission after a random backoff.

12. The OLT of claim 10, wherein the processor circuitry is further configured to:
detect a second unsolicited data burst from a second ONU of the plurality of ONUs;
broadcast a TX REFRAIN message in response to detecting the second unsolicited data burst, the TX REFRAIN message instructing other ONUs of the plurality of ONUs to refrain from transmission; and
transmit a TX SUSPEND message to the second ONU, the TX SUSPEND message instructing the second ONU to suspend transmission of the second unsolicited data burst.

13. The OLT of claim 12, wherein the TX SUSPEND message indicates a packet boundary or a byte boundary of the unsolicited data burst at which the second ONU suspends transmission.

14. The OLT of claim 12, wherein the processing circuitry is further configured to:
send a GATE message to a third ONU after the transmission of the TX SUSPEND message;
receive a REPORT message from the third ONU in response to the GATE message; and
send a TX RESUME message to the second ONU, the TX RESUME message instructing the second ONU to resume transmission of the second unsolicited data burst.

15. A Optical Line Terminal (OLT) connected to a plurality of Optical Network Units (ONUs) by a shared optical medium, comprising:
a memory that stores logic instructions; and
processor circuitry configured, by executing the logic instructions, to:
determine an upstream activity level of a first ONU of the plurality of ONUs; and
transmit a first unicast GATE message to the first ONU, the first unicast GATE message configured to set a reporting mode of the first ONU in response to the determined upstream activity level of the first ONU.

16. The OLT of claim 15, wherein the first unicast GATE message is configured to set the reporting mode of the first ONU to a probabilistic reporting (PR) mode when the upstream activity level of the first ONU is below a threshold, and to set the reporting mode of the first ONU to a periodic polling mode when the upstream activity level of the first ONU is above the threshold.

17. The OLT of claim 15, wherein the first unicast GATE message is configured to set the reporting mode of the first ONU to an unsolicited burst mode when the upstream activity level of the first ONU is below a threshold, and to set the reporting mode of the first ONU to a periodic polling mode when the upstream activity level of the first ONU is above the threshold.

18. The OLT of claim 15, wherein the processor circuitry is further configured to:
- determine a time of day; and
- transmit a second unicast GATE message to a second ONU of the plurality of ONUs, the second unicast message configured to set the reporting mode of the second ONU in response to the time of day.

19. The OLT of claim 15, wherein the processor circuitry is further configured to:
- determine a priority of upstream traffic of a second ONU of the plurality of ONUs; and
- transmit a second unicast GATE message to a second ONU of the plurality of ONUs, the second unicast message configured to set the reporting mode of the second ONU in response to the priority of upstream traffic of the second ONU.

20. The OLT of claim 15, wherein the upstream activity level of the first ONU corresponds to a first Logical Link Identifier (LLID) of a plurality of LLIDs associated with the first ONU, and wherein the first unicast GATE message is configured to set the reporting mode of the first ONU for only the first LLID.

* * * * *